US012006764B2

(12) United States Patent
Benotto

(10) Patent No.: US 12,006,764 B2
(45) Date of Patent: Jun. 11, 2024

(54) AIR SEAL FOR A LIFTABLE CLOSURE

(71) Applicant: BMPEUROPE S.r.l., Villanova d'Asti (IT)

(72) Inventor: Danilo Benotto, Montá (IT)

(73) Assignee: BMPEUROPE S.R.L. (IT)

( * ) Notice: Subject to any disclaimer, the term of this patent is extended or adjusted under 35 U.S.C. 154(b) by 0 days.

(21) Appl. No.: 17/987,455

(22) Filed: Nov. 15, 2022

(65) Prior Publication Data

US 2023/0167673 A1 Jun. 1, 2023

(30) Foreign Application Priority Data

Nov. 24, 2021 (IT) ........................ 102021000029690

(51) Int. Cl.
*E06B 7/20* (2006.01)
*E06B 9/15* (2006.01)
*E06B 9/17* (2006.01)

(52) U.S. Cl.
CPC .................. *E06B 7/20* (2013.01); *E06B 9/15* (2013.01); *E06B 9/17007* (2013.01); *E06B 2009/1566* (2013.01)

(58) Field of Classification Search
None
See application file for complete search history.

(56) References Cited

U.S. PATENT DOCUMENTS 5,027,494 A * 7/1991 Martin ................ E04F 21/0007 29/446
7,464,743 B1 * 12/2008 Berger, Jr. .............. E06B 9/581 160/133
10,526,838 B2 * 1/2020 Chang ........................ E06B 9/11
11,725,453 B2 * 8/2023 Koshar ................. A01M 29/30 49/58
2009/0008039 A1 * 1/2009 Lambridis ................. E06B 3/80 160/121.1

(Continued)

FOREIGN PATENT DOCUMENTS

DE 202009011324 1/2010 ............... E06B 7/28
FR 3046685 A1 * 7/2017 ............... E06B 7/02

OTHER PUBLICATIONS

Search Report issued in related Italian Patent Application Serial No. IT202100030011, dated Jul. 6, 2022, 2 pgs.

*Primary Examiner* — Marcus Menezes
(74) *Attorney, Agent, or Firm* — HAYES SOLOWAY P.C.

(57) ABSTRACT

A portal structure has an air seal device including an air sealing element movable between a lowered and a raised configuration. The portal structure has a compartment for storing the closure element, delimited by a front wall. A space is provided which communicates with the compartment and with the outer environment between the wall and the closure element. The air seal device includes first and second sealing members adapted to reach a facing position in which they adhere by magnetic attraction to close the space, one connected to the wall for supporting a ferromagnetic plate, the other consisting of a magnetic member fixed to the closure element. The first sealing member includes a base structure which can be fixed to said wall by first and second adjustable fasteners in a position corresponding to the position of the sealing member fixed to the surface of the closure element.

11 Claims, 3 Drawing Sheets

(56) References Cited

U.S. PATENT DOCUMENTS

| | | | | |
|---|---|---|---|---|
| 2009/0178344 | A1* | 7/2009 | Salerno | E06B 7/16 49/484.1 |
| 2011/0283620 | A1* | 11/2011 | Drifka | E06B 9/13 49/70 |
| 2012/0145337 | A1* | 6/2012 | Mortier | E05D 15/242 160/202 |
| 2015/0096696 | A1* | 4/2015 | Sentjurc | E06B 9/13 160/309 |
| 2017/0218699 | A1* | 8/2017 | Mugnier | E06B 9/88 |
| 2018/0119482 | A1* | 5/2018 | Chang | E06B 9/11 |
| 2021/0032928 | A1* | 2/2021 | Koshar | E06B 7/20 |
| 2021/0148166 | A1* | 5/2021 | Fischer | E06B 9/582 |
| 2022/0136321 | A1* | 5/2022 | Hoezee | E06B 3/70 49/31 |

* cited by examiner

AIR SEAL FOR A LIFTABLE CLOSURE

FIELD OF THE INVENTION

The present invention refers in general to liftable closures, such as for example doors for industrial use, such as the roll-up closures of the known so-called "rapid vertical sliding" type in which opening and closing steps occur at a relatively high speed.

BACKGROUND OF THE INVENTION

With reference to FIGS. 1 and 2 of the accompanying drawings, a liftable closure of the known type mentioned above comprises a stationary portal structure 12 associated with an opening 10 of a wall 11, which portal structure 12 is delimited by an upper horizontal crosspiece 14, by a pair of parallel and opposite vertical side uprights 16, and by a lower transversal plane 18. A sliding closure element 20 is associated with the portal structure 12, for example made by means of a flexible curtain 22 of plastic material, normally of PVC, polyethylene or polyurethane, or by means of a series of elongated panels, or slats, arranged transversely to the uprights 16 and articulated with each other, which is movable between a closed configuration and an open configuration, respectively lowered and raised with respect to the lower transverse plane 18.

The opposite longitudinal edges of the closure element 20 slidably engage respective opposite guide formations 24 shaped like a rail and incorporated in the side uprights 16 of the portal structure 12, which formations 24 define the path of the closure element 20 with respect to the structure 12.

A compartment 26 is provided above the crosspiece 14 for housing the closure element 20 in the raised configuration, which, in the most common case, comprises a box transverse to the uprights 16, in which is housed a rotating drum 29 for winding the element 20, typically driven by a motorized shaft. This compartment 26 is delimited at the front by a frontal and vertical wall 28 lying on a plane slightly spaced frontally with respect to the plane of the portal structure 12, so as to leave a free space 30 to facilitate the movement of the closure element 20 between its lowered and raised configuration, and vice-versa.

When the closure element 20 is in its lowered configuration, air coming from the outer environment (as indicated by the arrows A of FIG. 2) can freely enter the area of the compartment 26 through the free space 30, which air reaches the inside of the liftable closure causing a heat exchange between the zones arranged on the opposite sides of the element 20, which in many cases is desired to avoid.

In fact, the closure element 20 can also perform the function of a thermal insulation barrier for a room at a controlled temperature with respect to the outer environment, for example a cold room, in which the temperature must be kept as constant as possible. If the element 20 also performs the function of a thermal insulation barrier, a passage of air towards or from the insulated chamber through the space 30 inevitably causes a change of its temperature which needs to be opposed by cooling or heating, depending on the case, which entails additional costs for the installation of these means and for supplying them with the energy required for their operation.

In the Italian patent application No. 102017000024275 an air sealing device has been proposed in order to solve the aforementioned drawback, as schematically shown in the attached FIGS. 3 and 4. Briefly, this known device includes a first member 32 in the form of an elongated bracket, arranged on the side of the front wall 28 facing the compartment 26, and a second member 40 in the form of a magnetic strip fixed on the outer surface of the closure element 20 facing the outside environment. The member 32 comprises a plate portion 33 arranged adjacent to the front wall 28 and fixed thereto, a lower portion 34 substantially perpendicular to the portion 33 and directed towards the element 20, and a wing 36 of ferromagnetic material extending cantilever from the end of the lower portion 34 opposite to the plate portion 33. The wing 36 is slightly inclined with respect to the portion 33, its lower edge, on the side of the lower transverse plane 18, being closer to the element 20, while its upper edge is further spaced from the element 20. The portions 33, 34 and 36 may form part of an integral member 32 obtained as a result of bending a single sheet of ferromagnetic material.

The shape of the member 32 and the arrangements of the portion 36 and of the member 40 must be precisely calibrated so that the portion 36 and the member 40 assume a mutually facing and close position in the lowered configuration of the closure element 20, such as to allow their mutual adhesion by magnetic attraction in order to close the space 30 and block the passage of air through it.

However, this known device, although satisfactory in operation, is complex to install and to set up in an arrangement which can always ensure optimal magnetic adhesion of the second magnetic member 40 on the ferromagnetic plate 36. In fact, the shape of the member 32, in particular the length of its portion 33 and the inclination and width of its wing 36, must be optimized for each liftable closure, depending, for example, on the distance between the wall 28 and the closure element 20 as well as on the distance between the wing 36 and the element 20, which entails relatively long assembly times and an increase in the installation costs of the sliding door.

SUMMARY OF THE INVENTION

The object of the present invention is to propose an improved air seal device for a liftable closure, as defined in the preamble of the appended claim 1, which allows the position of at least one of the sealing members intended to adhere magnetically to each other, to be adjusted easily and effectively, in order to achieve a fast and definitive set-up of the sealing device, upon its installation.

This object is achieved by the invention by virtue of the characteristics set forth in the appended claims.

In particular, by virtue of the fact that the sealing member connected to said front wall comprises a base structure adapted to be fixed in an adjustable manner to said front wall by means of first fastening means, said ferromagnetic plate being supported by the base structure in an adjustable manner by means of second fastening means, so that said ferromagnetic plate can be fixed to the front wall in a position that corresponds punctually to the position reached by said sealing member fixed to the surface of the closure element when the latter is in its lowered configuration, the device of the invention allows the position of one of the sealing members affected by the magnetic adhesion to be adjusted in a practical and fast manner so as to obtain a very efficient adjustment of the sealing device.

Furthermore, this device can be used in a liftable closure both at the time of its first installation, and in a traditional type liftable closure already installed to improve its operation, with a few simple operations that can be performed by an operator even with little experience, for example during a normal maintenance step of this closure already installed.

According to a preferred feature of the invention, the base structure of the sealing member connected to the front wall comprises at least one L-shaped angular section bar arranged substantially perpendicular to said vertical guide elements. In this manner, the invention involves the use of simple and commonly used components, to the full advantage of containing the cost of the relevant device.

According to another preferred feature, each of said angular section bars has a first wing intended to be applied to the front wall and provided with a series of first slots directed transverse to its axial direction which form part of said first fastening means, at least some of said first slots being adapted to be engaged by respective adjustable fastening members projecting from the front wall, such as screws or pins associated with anchors or the like, and a second wing substantially perpendicular to the front wall for the connection of a sheet connected to said ferromagnetic plate and having a series of second slots, and in which a series of third slots is formed in said lamina which are directed perpendicular to the ferromagnetic plate, a pair of slots of said series of second and third slots, both being engaged by adjustable rod-shaped fixing members which are part of said second fixing means, each of which preferably comprises a nut screw and a respective tightening nut. The use of said first and second fastening means allows an effective and flexible adjustment to be achieved of the position of the sealing member intended to be connected to the front wall.

Furthermore, and according to yet another preferred feature, an inclined wall is interposed between said ferromagnetic plate and each transverse lamina. This makes it possible to have a guide portion for the sliding and adhesion of the magnetic member to the ferromagnetic plate, which occurs as a result of a relative movement of the magnetic member associated with the closure element, with respect to the ferromagnetic plate.

BRIEF DESCRIPTION OF THE DRAWINGS

Further characteristics and advantages of the invention will become clearer from the following detailed description, provided by way of non-limiting example and referred to the accompanying drawings in which.

DETAILED DESCRIPTION OF THE EMBODIMENTS

Figure 1:
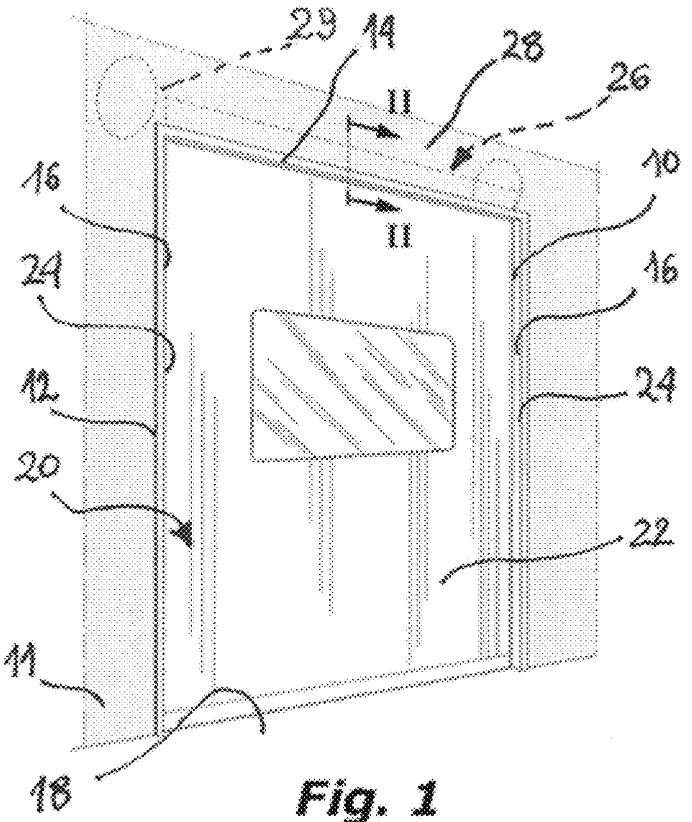
Fig. 1 (prior art)
FIG. 1 is a schematic perspective view of a liftable closure according to a first prior art, with the relevant closure element in its lowered configuration.
Figure 2:
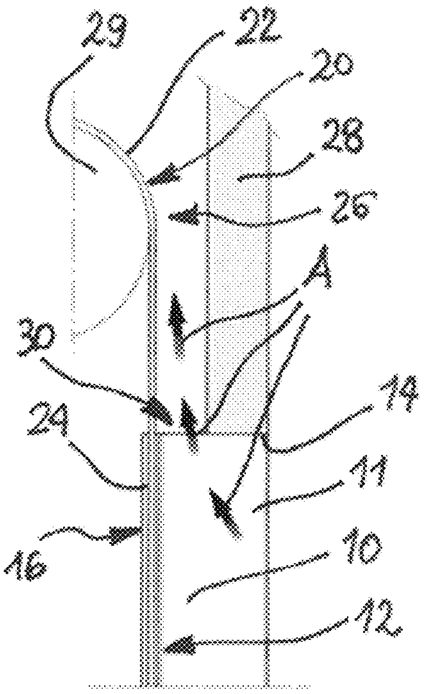
Fig. 2 (prior art)
FIG. 2 is an enlarged side elevational view sectioned along the line II-II of FIG. 1, showing in particular a space defined between the portal structure and a shelter compartment for the closure element in its raised configuration, through the which space can circulate air.
Figure 3:
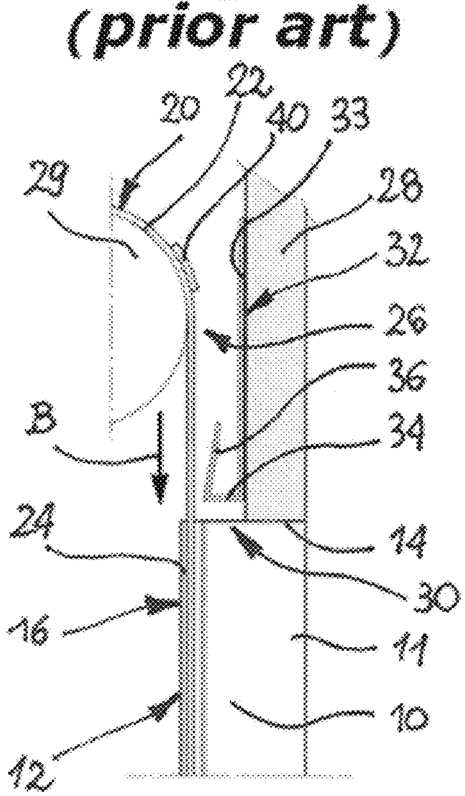
Fig. 3 (prior art)
FIG. 3 is a sectioned side elevational view of a closure element according to another prior art, made in the form of a flexible sheet on whose surface facing the outer environment a magnetic member is associated which is intended to cooperate magnetically with a ferromagnetic plate associated with a wall arranged in front of said shelter compartment.
Figure 4:
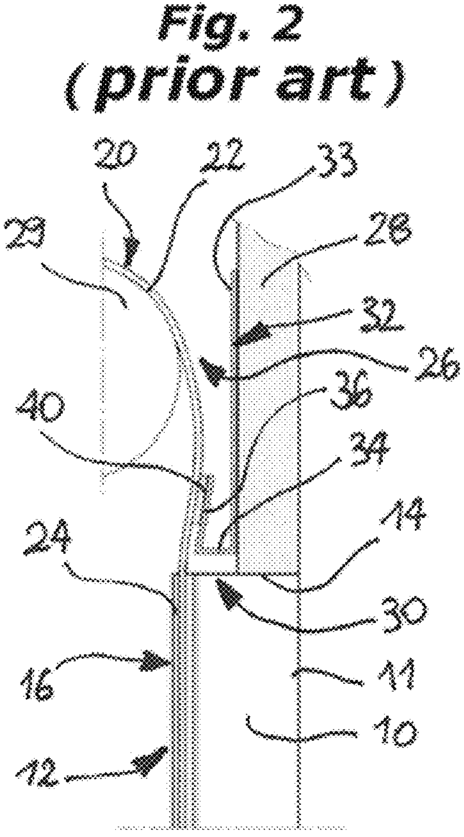
Fig. 4 (prior art)
FIG. 4 is a view similar to FIG. 3, showing the closure element according to the other prior art in its fully lowered configuration, in which the magnetic member and the ferromagnetic plate cooperate to close the space defined between the portal structure and the storage compartment of the closure element.
Figure 5:
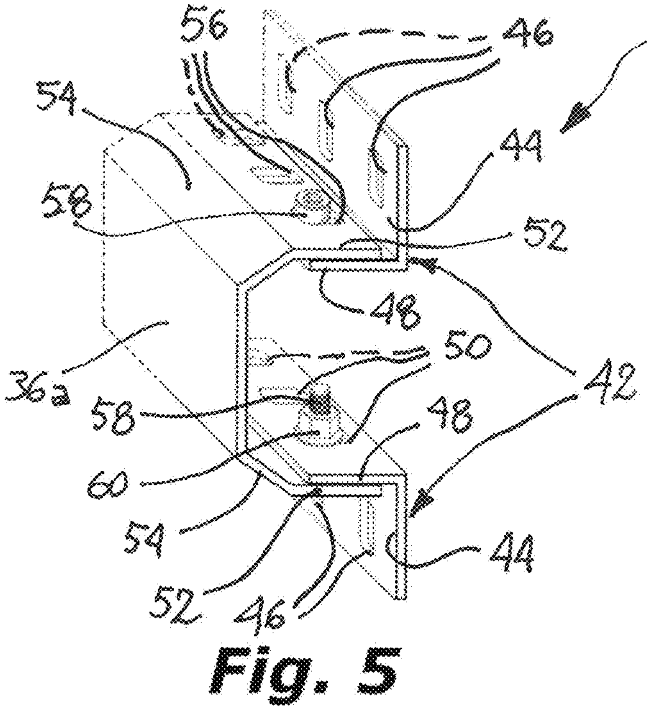
FIG. 5 is an enlarged perspective schematic view of an air seal device according to a first modification of the present invention.

With initial reference to FIGS. 5 to 8 of the drawings, a liftable closure equipped with the sealing device according to the invention comprises a sliding closure element 20, in this case made by means of a flexible curtain 22 of plastic material, such as PVC, polyethylene or polyurethane which, in general, is also suitable for performing the function of a thermal barrier and may include, for this purpose, an insulating intermediate layer (not shown).

The opposite longitudinal edges of the closure element 20 are slidably inserted into respective opposite guide formations 24 shaped like a rail and associated with the vertical parallel uprights 16 of a stationary portal structure 12 which delimits an opening 10 formed in a vertical wall 11, whereby the closure element 20 is movable between a closed configuration and an open configuration, respectively lowered and raised, with respect to a transversal plane 18 which delimits the portal structure 12 below.

The upper edge of the portal structure 12 is defined by a crosspiece 14 arranged adjacent to a front wall 28 which delimits a compartment 26 for sheltering the closure element 20 in the raised configuration, in which the latter is wrapped about a rotating drum 29 received within this compartment 26. Between the front wall 28, which is spaced apart from the portal structure 12, and the element 20 there is a transverse space indicated 30 which communicates on one side with the compartment 26 and on the other side with the outer environment through the opening 10.

An air sealing device according to a first modification of the invention is connected to the internal side surface of the front wall 28, which faces the compartment 26. This air sealing device (shown in FIG. 5), comprises a first sealing member indicated by the reference 32*a* in the drawings and including a ferromagnetic plate 36*a*, and a second sealing member consisting of a magnetic member 40 preferably in the form of a strip, which is fixed, for example by gluing, on the surface of the closure element 20 facing the outside of the portal structure 12, the first sealing member 32*a* and the second sealing member 40 being adapted to mutually cooperate by magnetic attraction.

The sealing member 32*a* comprises a base structure including a pair of spaced apart and parallel L-shaped angular section bars 42, arranged substantially perpendicular to the vertical guide elements 24, the length of which is conveniently equal to the width of the closure element 20. Each angular section bar 42 comprises a pair of wings, i.e. a first wing 44 and a second wing 48 perpendicular to the wing 44.

The first wing 44 is provided with a series of first slots 46 oriented transversely to its axial direction, at least some of which are engaged by respective adjustable fastening members, such as screws or pins associated with anchors or the like (not shown as being of a type known per se), installed on the wall 28 so as to protrude therefrom towards the compartment 26, to allow the first sealing member 32*a* to be fixed in an adjustable manner in the vertical direction with respect to this wall 28. Therefore, the slots 46 of the wing 44 of the angular section bars 42 and the fastening members projecting from the front wall 28 which engage them, constitute first adjustable fastening means for positioning the first sealing member 32*a*.

The second wing 48 of the angular section bars 42, intended to be arranged perpendicularly to the front wall 28, has a series of second slots 50 oriented transversally to its axial direction. The wings 48 of the two section bars 42 support respective transverse laminas 52 connected to the plate 36*a* on opposite sides, which laminas 52 have a series of third slots 56 equal to the series of second slots 50 and oriented perpendicularly to the plate 36*a*.

Between the plate 36*a* and each transverse lamina 52 an inclined wall 54 is interposed, for example of about 45°, having the function of invitation for the magnetic adhesion of the sealing member 40 on the plate 36*a* as a result of the sliding of the closure element 20.

Some pairs of slots 50 and 56 of the series of second and third slots are both engaged by rod-type adjustable fastening members, for example each comprising a nut-screw 58 and a respective tightening nut 60, to fix the plate 36*a* in an adjustable manner along the direction perpendicular to the wall 28 with respect to the base structure, in particular with respect to the pair of L-shaped angular sections bars 42. Therefore, the slots 50 of the wing 48 of the sections bars 42, together with the slots 56 of the transverse laminas 52 and the fastening members constituted by the elements 58, 60 which engage respective pairs of aligned slots 50 and 56, constitute second adjustable fastening means for positioning the first sealing member 32*a*.

By virtue of the presence of the aforementioned first and second adjustable fixing means, the plate 36*a* can be fixed to the front wall 28 in such a position as to result exactly facing the second magnetic sealing member 40 fixed to the surface of the closure element 20, when the latter is in its lowered configuration, to allow the magnetic sealing member 40 to adhere on the plate 36*a* so as to close the transversal gap 30 and prevent communication between the compartment 26 and the outer environment.

In the use of the air sealing device described above, after having fixed the magnetic sealing member 40 on the surface of the closure element 20 and having brought this latter element into its fully lowered configuration, the base structure including the pair of angular sections 42 is positioned on the front wall 28, which is arranged in such a manner that the plate 36*a* to be connected to the section bars 42 through the pair of laminas 52 is arranged exactly in front of the magnetic sealing member 40. Then, a series of fastening members, such as screws or pins associated with dowels or the like, are installed on the front wall 28 so as to project from this wall towards the compartment 26 to engage some of the slots 46 of the section bars 42, which fastening members are then locked in the desired position after making a fine adjustment of the vertical position of the base structure of the air sealing device.

Furthermore, in some of the pairs of slots 50 of the other wing 48 of the section bars 42, and of the slots 56 of the laminas 52 connected to the plate 36*a*, the slots 50 and 56 being arranged aligned with each other, respective nut screws 58 are inserted to which respective tightening nuts 60 are associated on the side of the wing 48, which are tightened after reaching the desired position of the ferromagnetic plate 36*a* by fine adjustment.

In this manner, by virtue of the presence of the first and second adjustable fixing means described above for positioning the first sealing member 32*a*, the position of the plate 36*a* can be adjusted as desired in the parallel direction and in the transverse direction with respect to the front wall 28, to allow the plate 36*a* to be fixed in a position exactly corresponding to the position reached by the sealing member 40 applied on the surface of the closure element 20 when the latter is in its lowered configuration.

When the element 20 reaches the completely lowered position and the magnetic strip 40 faces exactly the plate 36*a* (FIG. 8), the strip 40 applies on the plate 36*a* as a result of the magnetic attraction, closing the space 30 and preventing the passage of air so as to perform its sealing function. In this condition, the area of the closure element 20 on which the strip 40 is applied deforms slightly as it moves towards the front wall 28 to adhere to the plate 36*a*.

During the ascent of the element 20 towards its raised position, this deformation of the element 20 is nullified as a result of the tension applied to its upper part, causing the element 20 to move away from the wing 36*a*.

Figure 6:
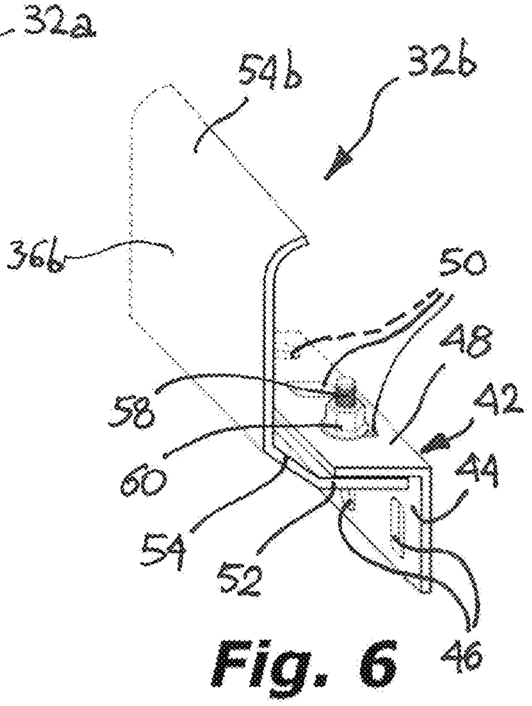
FIG. 6 is a view similar to FIG. 5 of a second modification of the air seal device of the invention.
Figure 7:
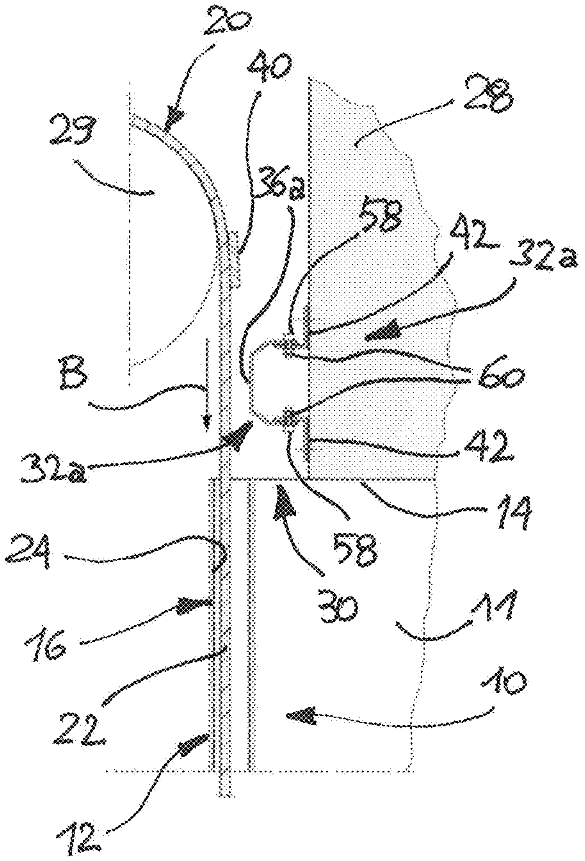
FIGS. 7 and 8 are sectional side elevational views similar to FIGS. 3 and 4, respectively, showing two subsequent steps of the operation of the air seal device of the first modification of the invention, which is used with a closure element consisting of a flexible sheet.
Figure 8:
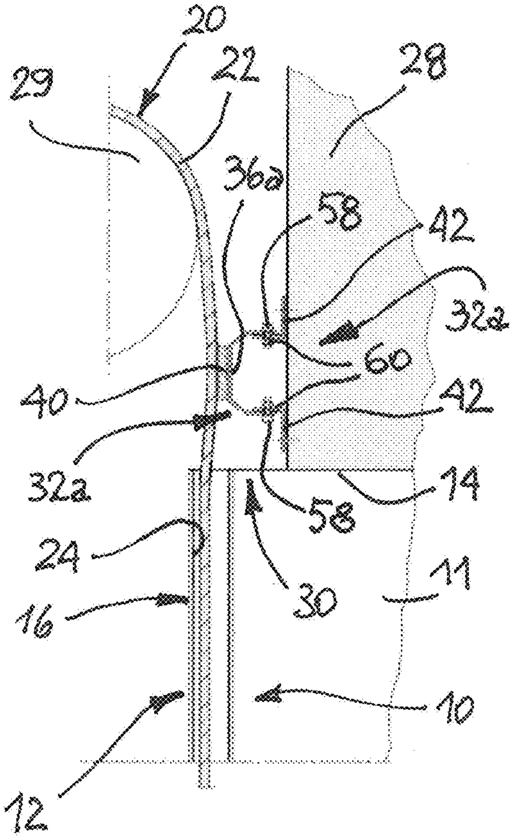

The air seal device can also be made according to a simplified modification shown in FIG. 6 of the drawings, in which the same or similar references have been used to indicate parts that are the same or similar to those of the modification described above.

In particular, the base structure of the present modification includes a single section bar 42 connected to the front wall 28 for supporting a ferromagnetic plate indicated 36*b*. The first wing 44 of this section bar 42 is equipped with the series of first slots 46, some of which are engaged by fastening members projecting from the wall 28, such as screws or pins associated with plugs or the like for the adjustable fastening in the vertical direction of the first sealing member 32*b*. Therefore, the slots 46 together with the fastening members which project from the wall 28 and which engage said slots 46, constitute the adjustable fastening means for positioning the first sealing member 32*b*.

In this case, the ferromagnetic plate 36*b* comprises a single lamina 52 arranged in its lower part with the interposition of an inclined wall 54, for fixing the wing 48 to the single section bar 42 by means of the slots 50 and 56, of the wing 48 and of the lamina 52 respectively, and by respective nut screws 58 with associated respective tightening nuts 60 which engage some pairs of said slots. The plate 36*b*, on the opposite side of the lamina 52, comprises an inclined or arcuate leading edge 54*b* to facilitate the sliding of the closure element 20 with the relative magnetic sealing member 40.

Figure 10:
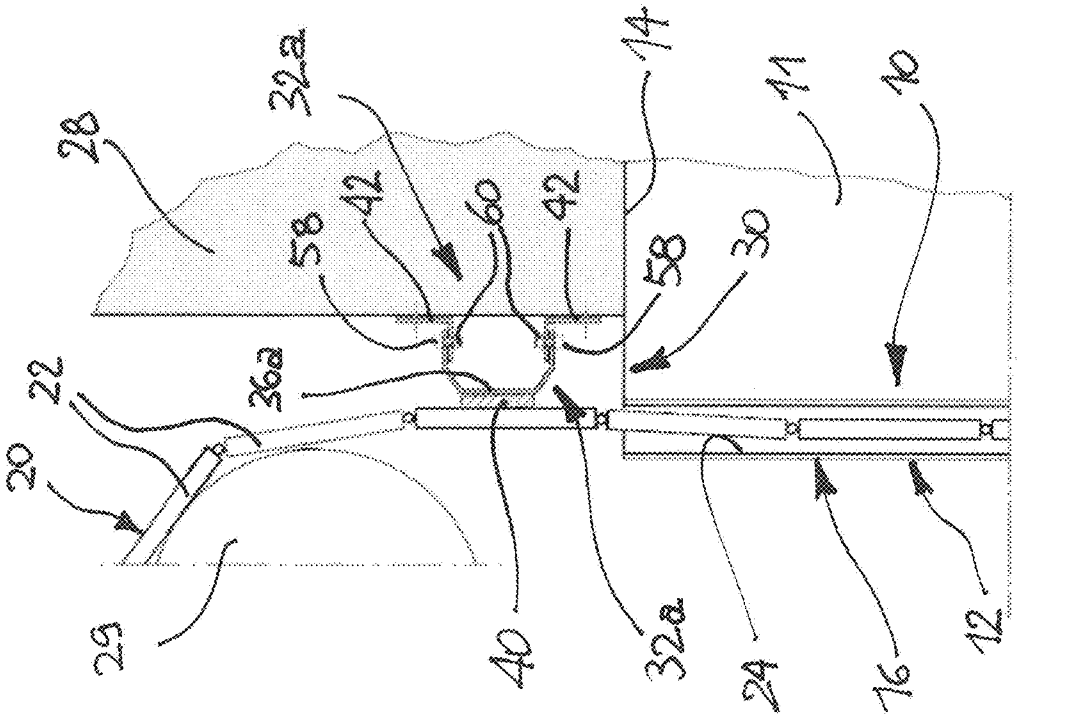
FIGS. 9 and 10 are sectional side elevation views, respectively similar to FIGS. 7 and 8, showing two subsequent steps of the operation of an air sealing device of the invention applied to a closure element comprising a series of substantially rigid and mutually articulated panels.
Figure 9:
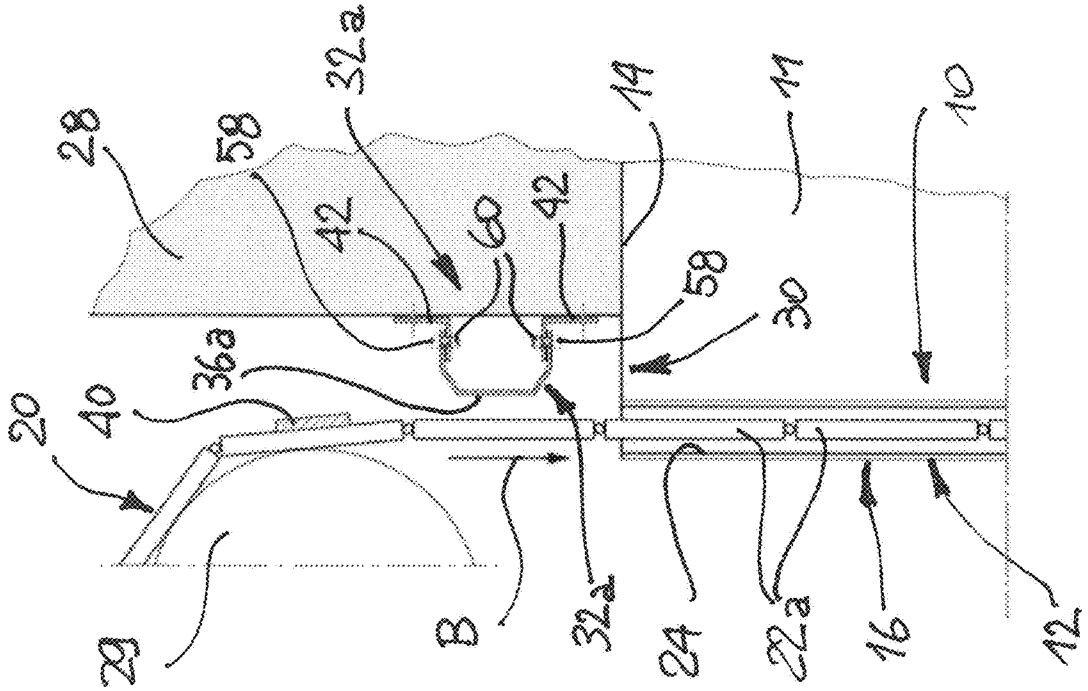

The invention can also be used with a closure element 20 other than a flexible sheet, for example including a series of substantially rigid elongated panels 22*a* connected to each other in an articulated manner by means of hinges, as schematically shown in the attached FIGS. 9 and 10. In short, these Figures shown in a manner respectively similar to FIGS. 7 and 8, a closure element 20 consisting of elongated panels 22*a* articulated to each other, which may comprise an inner layer of insulating material (not shown) to constitute a thermal barrier, the sealing member 40 being applied on the surface facing the front wall 28 of one of the panels 22*a*.

Although in this case the compartment 26 can be provided with the winding drum 29, it can, as an alternative, include a storage structure of the closure element 20 comprising rails (not shown) for housing this element 20 according to a raised and substantially flat arrangement when it is in the raised configuration, for example perpendicular to the guide formations 24.

The operation of the device of the invention applied to a closure element 20 including a series of elongated panels 22*a* is completely similar to that described above with reference to the closure element 20 consisting of a flexible curtain 22.

Although in the above description the plate member 36*a* or 36*b* has been indicated as a ferromagnetic plate, it could also be made as a plate of magnetic material with opposite polarity to that of the member 40.

Of course, the positions of the plate 36*a* or 36*b* and of the strip 40, which constitute respectively the first and the second member of the sealing device of the invention, can be reversed, whereby a strip of ferromagnetic material applied to the element 20 can be provided, as well as a magnetic plate fixed to the internal side of the front wall 28, as an alternative to what has been described above. In the latter case, in particular, the magnetic plate can be associated with an electromagnetic device, rather than being made up of a permanent magnet.

The invention claimed is:

1. An air sealing device for a liftable closure comprising a closure element slidably mounted along vertical guide elements of a portal structure so as to be movable between a lowered configuration in which it closes an opening defined by said portal structure, and a raised configuration in which said opening is open, and a compartment arranged above the portal structure to accommodate the closure element in its raised configuration, which compartment is delimited by a front wall spaced from the portal structure, a transverse space being defined between the closure element and said front wall which communicates on one side with said compartment and on the other side with the outer environment, the device including a first and a second sealing member, one of which is connected to said front wall on the side facing the compartment and supports a ferromagnetic plate, the other of which is a magnetic member, fixed on the surface of the closure element that faces the outside of the portal structure, said sealing members being adapted to reach respective mutually facing positions in the completely lowered configuration of the closure element to adhere to each other as a result of their magnetic attraction in order to close said transverse space for preventing communication between said compartment and the outer environment, the sealing member connected to said front wall comprising a base structure adapted to be fixed to said front wall in an adjustable manner by a first fastener, said ferromagnetic plate being supported by the base structure in an adjustable manner by a second fastener, so that said ferromagnetic plate can be fixed to the front wall in a position that corresponds precisely to the position reached by said sealing member fixed to the surface of the closure element when the latter is in its lowered configuration, the base structure of the sealing member connected to the front wall comprising at least one L-shaped angular section bar arranged substantially perpendicular to said vertical guide elements, wherein each of said angular section bars has a first wing intended to be applied to the front wall and provided with a series of first slots directed transverse to its axial direction which form part of said first fastener, at least some of said first slots being adapted to be engaged by respective adjustable fastening members projecting from the front wall, and a second wing substantially perpendicular to the front wall for the connection of a lamina connected to said ferromagnetic plate and having a series of second slots, and in which a series of third slots is formed in said lamina which are directed perpendicular to the ferromagnetic plate, a pair of slots of said series of second and third slots, both being engaged by adjustable rod-shaped fixing members which are part of said second fastener, each of which preferably comprises a nut screw and a respective tightening nut.

2. The device of claim 1, wherein the base structure of the sealing member connected to said front wall comprises a pair of parallel L-shaped angular section bars, arranged substantially perpendicular to said vertical guide elements.

3. The device of claim 1, wherein said ferromagnetic plate is connected to a pair of laminas parallel and transverse thereto, both provided with respective series of slots.

4. The device of claim 3, wherein an inclined wall is interposed between said ferromagnetic plate and each transverse lamina.

5. The device of claim 1, wherein said ferromagnetic plate is connected to a single lamina transverse thereto, provided with a respective series of slots.

6. The device of claim 5, wherein an inclined wall is interposed between said ferromagnetic plate and the respective transverse lamina, the ferromagnetic plate having an inclined or arched edge on its side opposite to the transverse lamina.

7. The device of claim 1, wherein said closure element comprises a flexible curtain formed of a plastic material.

8. The device of claim 1, wherein said closure element comprises a series of substantially rigid elongated panels connected to each other in an articulated manner by hinges.

9. The device of claim 1, wherein the magnetic member is in a form of a strip.

10. The device of claim 1, wherein the adjustable fastening members comprise screws or pins associated with anchors.

11. The device of claim 7, wherein said plastic material is selected from the group consisting of PVC, polyethylene and polyurethane.

* * * * *